United States Patent [19]
Audibert et al.

[11] Patent Number: 5,669,456
[45] Date of Patent: Sep. 23, 1997

[54] PROCESS AND WATER-BASE FLUID UTILIZING HYDROPHOBICALLY MODIFIED CELLULOSE DERIVATIVES AS FILTRATE REDUCERS

[75] Inventors: Annie Audibert, Le Vesinet; Jean-Francois Argillier, Suresnes, both of France; Louise Bailey, Comberton; Paul L Reid, Cambridgeshire, both of Great Britain

[73] Assignees: Institut Francais du Petrole, Rueil-Malmaison, France; Dowell Schlumberger, Inc., Sugar Land, Tex.

[21] Appl. No.: 673,478

[22] Filed: Jul. 1, 1996

Related U.S. Application Data

[63] Continuation of Ser. No. 400,102, Mar. 3, 1995, abandoned.

[30] Foreign Application Priority Data

Mar. 3, 1994 [FR] France ................... 94 02572

[51] Int. Cl.$^6$ .................. C09K 7/02; E21B 33/138; E21B 43/25
[52] U.S. Cl. .................. 175/72; 166/312; 507/113; 507/114; 507/215; 507/216; 507/925
[58] Field of Search ................... 166/282, 283, 166/291, 312; 175/72; 507/112, 113, 114, 214, 215, 216, 925, 926

[56] References Cited

U.S. PATENT DOCUMENTS

| | | | |
|---|---|---|---|
| 4,228,277 | 10/1980 | Landoll | |
| 4,404,107 | 9/1983 | Cowan et al. | 507/925 X |
| 4,529,523 | 7/1985 | Landoll | 166/273 X |
| 4,531,594 | 7/1985 | Cowan | 175/72 |
| 4,684,704 | 8/1987 | Craig | 526/200 |
| 4,691,013 | 9/1987 | Sekimoto et al. | 536/96 |
| 4,784,693 | 11/1988 | Kirkland et al. | 106/314 X |
| 4,892,589 | 1/1990 | Kirkland et al. | 106/314 X |
| 4,902,733 | 2/1990 | Angerer | 524/44 |
| 4,994,112 | 2/1991 | Majewicz et al. | 106/774 X |

FOREIGN PATENT DOCUMENTS

| | | |
|---|---|---|
| 314118 | 10/1988 | European Pat. Off. |
| 465992 | 7/1991 | European Pat. Off. |

OTHER PUBLICATIONS

Database WPI, Derwent Publications 83-787503.

*Primary Examiner*—George A. Suchfield
*Attorney, Agent, or Firm*—Millen, White, Zelano, & Branigan, P.C.

[57] ABSTRACT

The present invention relates to a process used in a well for controlling the filtration of a drilling, a completion or a workover fluid set in a well. The process comprises adding a predetermined amount of at least one hydrophobically modified cellulose derivative. In a variant of the invention, the cellulose derivative is a hydrophobically modified hydroxyethylcellulose. The invention further relates to a drilling, a completion or a workover fluid including at least one hydrophobically modified cellulose derivative, for example hydrophobically modified hydroxyethylcellulose and notably viscosifiers such as polymers or reactive clay.

16 Claims, No Drawings

PROCESS AND WATER-BASE FLUID UTILIZING HYDROPHOBICALLY MODIFIED CELLULOSE DERIVATIVES AS FILTRATE REDUCERS

This application is a continuation of application Ser. No. 08/400,102, filed Mar. 3, 1995, now abandoned.

FIELD OF THE INVENTION

The present invention relates to operations performed in order to develop subsurface reservoirs containing hydrocarbons. More particularly, the invention describes a process for controlling the filtration losses of a drilling, a completion or a workover fluid run in a well drilled through geologic formations.

BACKGROUND OF THE INVENTION

Conventional well drilling, completion or workover techniques comprise the circulation of a fluid injected towards the well bottom through a string of tubes making up the drill string or the production string, the fluid flowing up towards the surface in the annulus defined by the walls of the well and the outside of the string of tubes. During the upflow, a certain amount of fluid enters the porous or fractured geologic formations. This lost amount of fluid is called filtration loss or filtrate. It is generally advisable to limit the amount of filtrate because it represents costly product consumption, requires additional conditioning operations in the mud conditioning plant and also presents risks of destabilization of the well walls or of clogging of the producing or potentially producing geologic zones.

Many filtrate reducing products for water-base fluids, such as drilling fluids, completion fluids or workover fluids, are known in the profession. The use of organic colloids such as starch or CMC (carboxymethylcellulose) may for example be cited. U.S. Pat. No. 4,784,693 mentions the use of a HMHEC polymer or hydrophobically modified hydroxyethylcellulose as a filtrate reducer for a cement slurry with a string of tubes in a well. However, the specific purpose and the composition of a cement slurry, its behavior and its physical or theological characteristics are different from those of a fluid, for example a drilling, a completion or a workover fluid. In fact, the water content, the composition, the salinity and the solid-liquid ratio of a cement slurry are notably suited for a fluid intended to solidify in the well. On the contrary, a fluid such as a drilling, a completion or a workover fluid is suited for being injected towards the well bottom from a surface pumping plant, then either for flowing up to the surface in order to be processed and/or controlled prior to a possible new injection cycle, or for remaining in the well but while keeping substantially the same physicochemical characteristics as originally.

DESCRIPTION OF THE INVENTION

The present invention thus relates to a process used in a well drilled through at least one geologic formation having a given permeability. At least one of the following operations is performed: well drilling, well completion, well workover, and the permeability of the walls of said well drilled in said formation is controlled by adding a predetermined amount of at least one hydrophobically modified cellulose derivative. In a variant, the cellulose derivative is a hydrophobicaly modified hydroxyethylcellulose.

The modified hydroxyethylcellulose may include a hydrophobic alkyl radical having between 4 and 25 carbon atoms and preferably between 8 and 18 carbon atoms.

The molecular mass of the modified hydroxyethylcellulose may be less than 2,000,000 daltons and preferably ranges between 20,000 and 500,000 daltons.

In the process, the fluid may contain between 1 and 30 grams per liter of hydrophobically modified hydroxyethylcellulose and preferably between 1 and 15 g/l.

The fluid may contain at least one polymer selected from the group formed by xanthan, scleroglucan, wellan, hydroxyethylcellulose (HEC), CMC, guar gum and the polyacrylamides.

The invention further relates to a water-base fluid intended for well drilling, completion or workover, containing a predetermined amount of at least one hydrophobically modified cellulose derivative. The filtrate of this fluid may be controlled by adding a predetermined amount of at least one hydrophobically modified cellulose derivative. In a variant, the cellulose derivative is a hydrophobically modified hydroxyethylcellulose (HM HEC).

The viscosity of the fluid can be mainly controlled by adding at least one polymer selected from the group formed by xanthan, scleroglucan, wellan, hydroxyethylcellulose (HEC), CMC, guar gum and the polyacrylamides.

The fluid may contain at least one electrolyte at concentrations which may reach saturation.

The electrolyte may be selected from the group formed by sodium, potassium, calcium, magnesium and zinc chloride, bromide, carbonate, acetate, formate, insofar as they constitute soluble salts.

The fluid may contain between 0.5 and 30 g/l of HM HEC and between 0.5 and 20 g/l of viscosifying polymer.

The fluid may contain between 0.5 and 10 g/l of HM HEC, between 2 and 4 g/l of viscosifying polymer, preferably xanthan, between 10 and 100 g/l of KCl or NaCl and between 0 and 30 g/l of reactive clay.

The invention further concerns a fluid loss additive for drilling, completion and workover water base fluid containing at least one hydrophobically modified cellulose derivative, such as a water soluble hydrophobically modified hydroxyethylcellulose (HMHEC).

Water soluble hydrophobically modified cellulose derivatives mainly derive from conventionally used cellulose derivatives such as carboxymethylcellulose (CMC), hydroxyethylcellulose (HEC) or hydroxypropylcellulose (HPC). These derivatives can be chemically modified through the incorporation of alkyl groups by chemical reaction affecting certain cellulose units. These hydrophobically modified cellulose derivatives, notably HM HEC, HM CMC, HM HPC are described in document EP-A1-465,992.

The HM HEC polymer or hydrophobically modified hydroxyethylcellulose has been described in document U.S. Pat. No. 4,228,277 and in the publication "Synthesis and solution properties of hydrophobically modified hydroxyethylcellulose" by A. C. SAU and L. M. LANDOLL, in "Polymers in aqueous media: performance through association", J. E. GLASS (Ed), Adv. Chem Ser. 213, ACS Wash. 1989.

The HM HEC, nonionic and hydrosoluble, may be prepared from HEC or hydroxyethylcellulose, through the chemical incorporation of a long alkyl chain between $C_4$ and $C_{25}$, preferably between 8 and 18 carbon atoms as the hydrophobic unit.

The hydrophobic unit is bound to the cellulose by an ether or ester bond, preferably an ether bond because this type of bond is more stable when the polymer is in aqueous solution.

The proportion of hydrophobic units may range from 0.2 to about 5%, preferably from 0.2 to 1.5% and more specifically between 0.2 and 1%.

The HM HEC polymer may have a hydroxyethyl unit molar substitution rate of at least 1.5, preferably between 1.5 and 4, i.e. 1.5 to 4 moles of hydroxyethyl substituents per anhydroglucose unit, and a relatively low molecular mass, i.e. less than 2,000,000 daltons and preferably between 20,000 and 500,000 (that is a degree of polymerization of 75 to 1800).

The applicant has established that the HM HEC polymer defined above has good qualities for controlling the filtration of a drilling, a completion or a workover fluid, all fluids whose continuous liquid phase is aqueous. The fluid circulating or set by circulation in the well may contain viscosifiers based on reactive clays and/or polymers of a specific nature to fulfill notably the function of a viscosifier.

A well completion fluid is a fluid displaced in a well to be set in a production well. During its displacement or its setting, this fluid is in contact, during a more or less extended time, with the producing or potentially producing geologic formation. This also applies to a workover fluid.

The physical and/or chemical characteristics of these fluids are controlled and adjusted according to the nature of the geologic formation and of the effluents present, of the bottomhole conditions and of the various functions which may be fulfilled by such fluids, for example cleaning, stabilization, pressures control, etc. Furthermore, these fluids must not, as far as possible, modify the productivity of the geologic productive series. These types of fluids therefore preferably contain no or few solids, although in some cases the presence of reactive or inert solids is inevitable. In any case, filtration control is a very important parameter.

The fluids according to the present invention may also be set or displaced in the well in the form of a "spacer" or volume of fluid displaced by another fluid of different composition, or inserted between two other fluids.

A variant of the invention relates to fluids intended for slim hole drilling or for highly slanted drilling. These fluids, intended for the above-cited applications, are preferably determined to exhibit the following characteristics:

they have a low viscosity at high shear rates, in order to reduce pressure drops, they form a gel at rest in order to keep the cuttings in suspension during circulation stops, they contain a limited percentage of solids which may tend to form deposits or amalgams notably under the action of the centrifugation caused by the rotation of the drillpipe string in a hole of small diameter in relation to the size of the drillpipe string, or under the action of gravity in the case of horizontal wells without a solid or with very few solids in comparison with conventional drilling, it is well-known that filtration control is very delicate.

Fluids circulating under such particular conditions thus contain generally practically no reactive clayey colloids as base viscosifiers, but specific polymers. It is well-known that these fluids, called "solid-free" fluids or "without solid supply" pose problems in obtaining good filtration characteristics, particularly at average or high temperatures, with conventional filtrate-reducing products. On the other hand, the HM HEC used according to a variant of the present invention displays good capacities for controlling the filtration, particularly in combination with certain viscosifying polymers.

In view of the structural similarities between the HM HEC and the HM CMC, it ensues therefrom that the behavior of the HM CMC is close to that of the HM HEC, notably in its filtrate control capacity. This also applies to the other hydrophobically modified cellulose derivatives.

The following tests establish the characteristics of the HM HEC under various working conditions and according to conventional test procedures. The polymer tested is one of the products currently available on the market for various applications, notably cosmetics, and whose molecular mass is estimated between 200,000 and 800,000. The filtration tests have been carried out according to the API (American Petroleum Institute) standards in force: API RP23 BI section 3—Filtration—June 1990. The filtrates are expressed in milliliters (ml), the plastic viscosity VP in mPa.s, the yield value YV in lb/100 ft$^2$ (to be multiplied by 0.4788 to express YV in Pa) and the cake thickness is expressed in millimeters.

Various fluid formulations have been tested, with or without addition of weighting materials of the barite type, the viscosifier being generally a polysaccharide of the xanthan or of the scleroglucan type.

The formulations according to the invention have been compared with conventional formulations containing filtrate reducers known in the profession, such as low viscosity CMC (carboxymethylcellulose) which may be presently considered to be one of the best products available with, for certain applications, HEC (hydroxyethylcellulose) or PAC (polyanionic cellulose) whose molecular mass is higher than that of the CMC.

EXAMPLES

Test No. 1:

Comparison of the efficiency of HM HEC with conventional filtrate reducers

Conditions: API standard, ambient temperature (30° C.)

Base formulation FB: xanthan 4 g/l, KCl 50 g/l.

| FB additive | Filtrate 30 min | VP | YV | Cake |
|---|---|---|---|---|
| — | 24 | | | |
| Low vis. CMC 10 g/l | 20 | 13 | 8 | <1 |
| HEC 4 g/l | 35 | | | |
| HM HEC 4 g/l | 19 | 18 | 18 | <1 |

The xanthan of IDVIS make, the low viscosity CMC, the HEC used are respectively marketed by the IDF and Aqualon companies.

Notes:

The filtration characteristics in the presence of HM HEC are at least higher than the low viscosity CMC, which is currently considered to be one of the best products available.

Test No. 2:

Influence of the formulation density

| Formulation | Xanthan 4 g/l<br>KCl 50 g/l<br>HM HEC 4 g/l<br><br>d = 1.05 | Xanthan 4 g/l<br>KCl 50 g/l<br>HM HEC 4 g/l<br>Barite for<br>d = 1.64 |
|---|---|---|
| Filtrate 30 min | 19 | 8 |
| VP | 18 | 19 |
| YV | 18 | 28 |
| Cake thickness (mm) | >1 | 2 |

Notes:

The addition of barite to the formulation examined above allows the fluid density to be increased up to 1.64. The 30' filtrate is then low (8 ml). By comparison, a CMC-based formulation (Test No. 3) also exhibits a low filtrate (3.2 ml) but with a high plastic viscosity (36).

Test No. 3:
Comparison of the efficiency of HM HEC with conventional filtrate reducers, for a fluid of density 1.64
  Conditions: API standard, ambient temperature (30° C.)
  Base formulation FB: xanthan 4 g/l, KCl 50 g/l, barite for d=1.64.

| FB additive | Filtrate 30 min | VP | YV |
|---|---|---|---|
|  | 32 | 28 | 6 |
| Low vis. CMC 10 g/l | 3.2 | 36 | 11 |
| HM HEC 4 g/l | 8.2 | 19 | 28 |

Test No. 4:
Comparison of the efficiency of HM HEC with conventional filtrate reducers
  Conditions: API standard, ambient temperature (30° C.).

| Formulation | Xanthan 4 g/l<br>KCl 50 g/l<br>HM HEC 4 g/l<br>Barite for<br>d = 1.64 | Sclero. 1 g/l<br>$K_2CO_3$ 250 g/l<br>PAC 5 g/l<br>Barite for<br>d = 1.64 |
|---|---|---|
| Filtrate 30 min | 8 | 11.5 |
| VP | 19 |  |
| YV | 28 |  |
| Cake thickness (mm) | 2 |  |
| Formulation | Xanthan 3 g/l<br>$CaCl_2$ 210 g/l<br>HM HEC 3 g/l<br>d = 1.2 | Xanthan 3 g/l<br>$K_2CO_3$ 250 g/l<br>CMC LV 7 g/l<br>d = 1.2 |
| Filtrate 30 min | 12 | 31 |
| VP | 24 | 34 |
| YV | 14 | 11 |
| Cake thickness (mm) | <1 |  |
| Formulation | Xanthan 3 g/l<br>$CaCl_2$ 750 g/l<br>PAC 7 g/l<br>d = 1.5 | Xanthan 3 g/l<br>CMC HV 7 g/l<br>(high viscosity)<br>d = 1.2 |
| Filtrate 30 min | 17 | 3 |
| VP | 110 | 110 |
| YV | 40 | 70 |
| Cake thickness (mm) | <2 |  |

Notes:
It should be noted that the PAC or CMC HV type products lead to low filtrate volumes but to high viscosity increases. This is not the case for the HM HEC.

Test No. 5:
Influence of temperature (50° C.)
  Conditions: API standard, in a HP/HT test cell with a pressure of 35 bars and a back pressure of 15 bars.
  Base formulation FB: xanthan 4 g/l, KCl 50 g/l and HM HEC 4 g/l.

|  | Temperature 30° C. | Temperature 50° C. after 24 h aging at 50° C. |
|---|---|---|
| Filtrate 30 min | 19 | 15 |
| VP | 18 |  |
| YV | 18 |  |
| Cake thickness (mm) |  |  |

Notes:
The temperature increase generally leads to a strengthening of the hydrophobic interactions. A better filtrate reduction of the HM HEC is observed under the effect of temperature. This is confirmed by Test No. 6.

Test No. 6:
Influence of temperature (120° C.)
  Conditions: in a HP/HT test cell with a pressure of 35 bars and a back pressure of 15 bars, but with a filtration temperature of 120° C.

Base formulation FB: xanthan 4 g/l, KCl 50 g/l.

| FB additive | Filtrate 30 min | VP | YV | Cake |
|---|---|---|---|---|
| Low vis. CMC 10 g/l | 12.8 | 13 | 8 | 1 |
| HM HEC 4 g/l | 12 | 18 | 18 | 1 |

Test No. 7:
Formulations with solids
  Conditions: API standard temperature of 30° C.
  Base formulation FB: Green Bond clay 30 g/l, NaCl 10 g/l.

| FB additive | Filtrate 30 min | VP | YV | Cake |
|---|---|---|---|---|
| 1) Xanthan 4 g/l<br>and HM HEC 3 g/l | 11 | 19 | 30 | 1 |
| 2) Xanthan 2 g/l<br>and HM HEC 1 g/l | 14 |  | 22 | 38 | 2 |

Notes:
A certain amount of clay may be used in association, for example with xanthan. The filtrate level obtained remains low.

The various tests of the present description thus confirm that the fluid formulations suited to well drilling, completion or workover, which preferably contain a viscosifying polymer in aqueous solution, possibly reactive and/or inert solid particles, may have good filtration characteristics by using an efficient amount of HM HEC as a filtrate reducer. It is well-known that filtrate reducing polymers such as CMC or HEC disperse and homogenize the suspension by adsorption on the solid particles, while making them more negative and thus more repellent. The filtration of this homogeneous suspension then leads to the formation of a cake having a rather regular structure and consequently relatively impermeable. The permeability of the cake may be further decreased by a free polymer which gels in the pores of the cake.

The HM HEC polymer notably fulfills such a function or an equivalent function. However, the particular structure of the HM HEC of the present invention is also likely to form an ordered three-dimensional structure without requiring, in order to form a cake of low permeability, a solid particle support such as clay or barite. The temperature stability of the structure of the HM HEC allows its application in the various fields of interest of the profession. The advantages and the functions of the HM HEC are found in the polymers of this class for molecular masses lower than about 2,000,000 daltons.

Within the scope of specific applications in which the fluids contain practically no reactive solids, for example slim hole or slant drilling applications, completion or workover fluids, the association of HM HEC as a filtrate reducer associated with a viscosifying polymer, xanthan for example, gives the fluids good filtration characteristics even at high temperatures.

We claim:

1. A process for controlling the permeability of the walls of a well drilled through at least one geologic formation, comprising adding a predetermined amount of at least one water-soluble hydrophobically modified cellulose derivative to a volume of water-base fluid employed in the well during well drilling, well completion or well workover.

2. A process as claimed in claim 1, wherein said cellulose derivative is a hydrophobically modified hydroxyethylcellulose.

3. A process as claimed in claim 2, wherein the modified hydroxyethylcellulose contains a hydrophobic alkyl radical having 4 to 25 carbon atoms.

4. A process as claimed in claim 2, wherein the molecular mass of the modified hydroxyethylcellulose is less than 2,000,000 daltons.

5. A process as claimed in claim 2, wherein said fluid contains 1 to 30 grams per liter of hydrophobically modified hydroxyethylcellulose.

6. A process as claimed in claim 1, wherein said fluid contains at least one polymer which is xanthan, scleroglucan, wellan, hydroxyethylcellulose (HEC), CMC, guar gum or a polyacrylamide.

7. A process as claimed in claim 2, wherein the modified hydroxyethylcellulose contains a hydrophobic alkyl radical having between 8 to 18 carbon atoms.

8. A process as claimed in claim 2, wherein the molecular mass of the modified hydroxyethylcellulose is between 20,000 and 500,000 daltons.

9. A process as claimed in claim 2, wherein said fluid contains 1 to 15 grams per liter of hydrophobically modified hydroxyethylcellulose.

10. A process as claimed in claim 2, wherein the modified cellulose contains derivative a hydrophobic alkyl radical.

11. A process according to claim 1, wherein the water-base fluid maintains substantially the same physiochemical characteristics throughout the process.

12. A process according to claim 1, wherein the water-base fluid is not a cement slurry.

13. A process according to claim 10, wherein the alkyl group is attached to the cellulose derivative through an ether or ester bond.

14. A process as claimed in claim 1, wherein said cellulose derivative is a hydrophobically modified carboxymethyl cellulose or a hydrophobically modified hydroxypropyl cellulose.

15. A process for controlling the permeability of the walls of a well drilled through at least one water-soluble geologic formation comprising adding a predetermined amount of at least one hydrophobically modified cellulose derivative to a volume of water-based fluid employed in the well during well drilling, well completion or well workover, wherein said hydrophobically modified cellulose derivative is employed in an essentially solid-free fluid.

16. A process for controlling the permeability of the walls of a well drilled through at least one geologic formation, comprising adding a predetermined amount of at least one water-soluble hydrophobically modified cellulose derivative to a volume of water-based well-drilling fluid, well-completion fluid or well workover fluid injected into said well.

\* \* \* \* \*

UNITED STATES PATENT AND TRADEMARK OFFICE
CERTIFICATE OF CORRECTION

PATENT NO. : 5,669,456
DATED : September 23, 1997
INVENTOR(S) : Annie AUDIBERT et al.

It is certified that error appears in the above-identified patent and that said Letters Patent is hereby corrected as shown below:

Claim 20 should read as follows:

20. A process for controlling the permeability of the walls of a well drilled through at least one geologic formation comprising adding a predetermined amount of at least one water-soluble hydrophobically modified cellulose derivative to a volume of water-based fluid employed in the well during well drilling, well completion or well workover, wherein said hydrophobically modified cellulose derivative is employed in an essentially solid-free fluid.

Signed and Sealed this

Seventh Day of April, 1998

Attest:

BRUCE LEHMAN

Attesting Officer

Commissioner of Patents and Trademarks